No. 882,792. PATENTED MAR. 24, 1908.
E. L. McKINNON.
CHEESE PRESS.
APPLICATION FILED MAY 2, 1907.
2 SHEETS—SHEET 1.
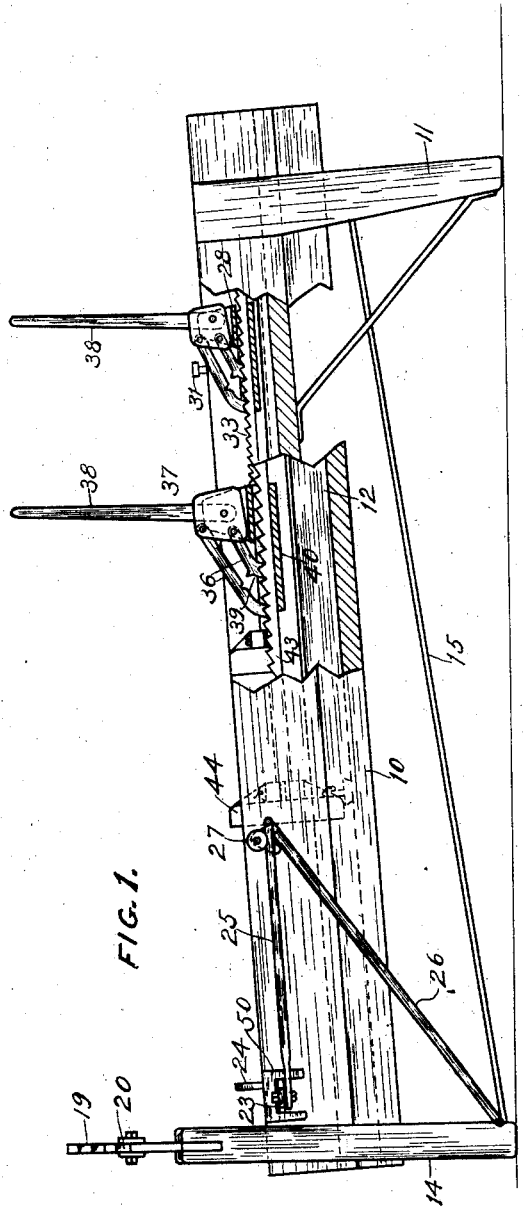
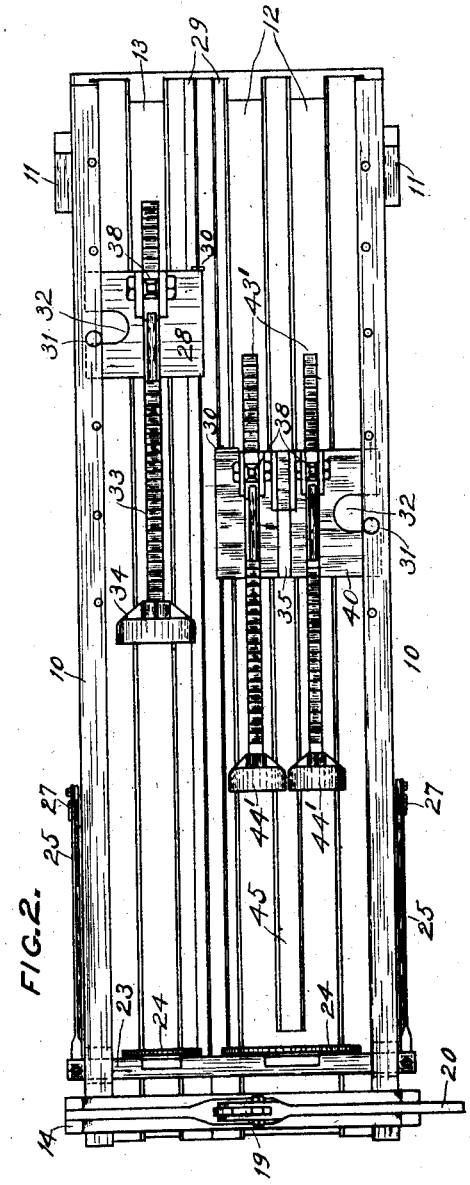
WITNESSES.
INVENTOR.
Elmer L. McKinnon,
By Benedict, Morsell & Caldwell,
ATTORNEYS.

No. 882,792. PATENTED MAR. 24, 1908.
E. L. McKINNON.
CHEESE PRESS.
APPLICATION FILED MAY 2, 1907.
2 SHEETS—SHEET 2.
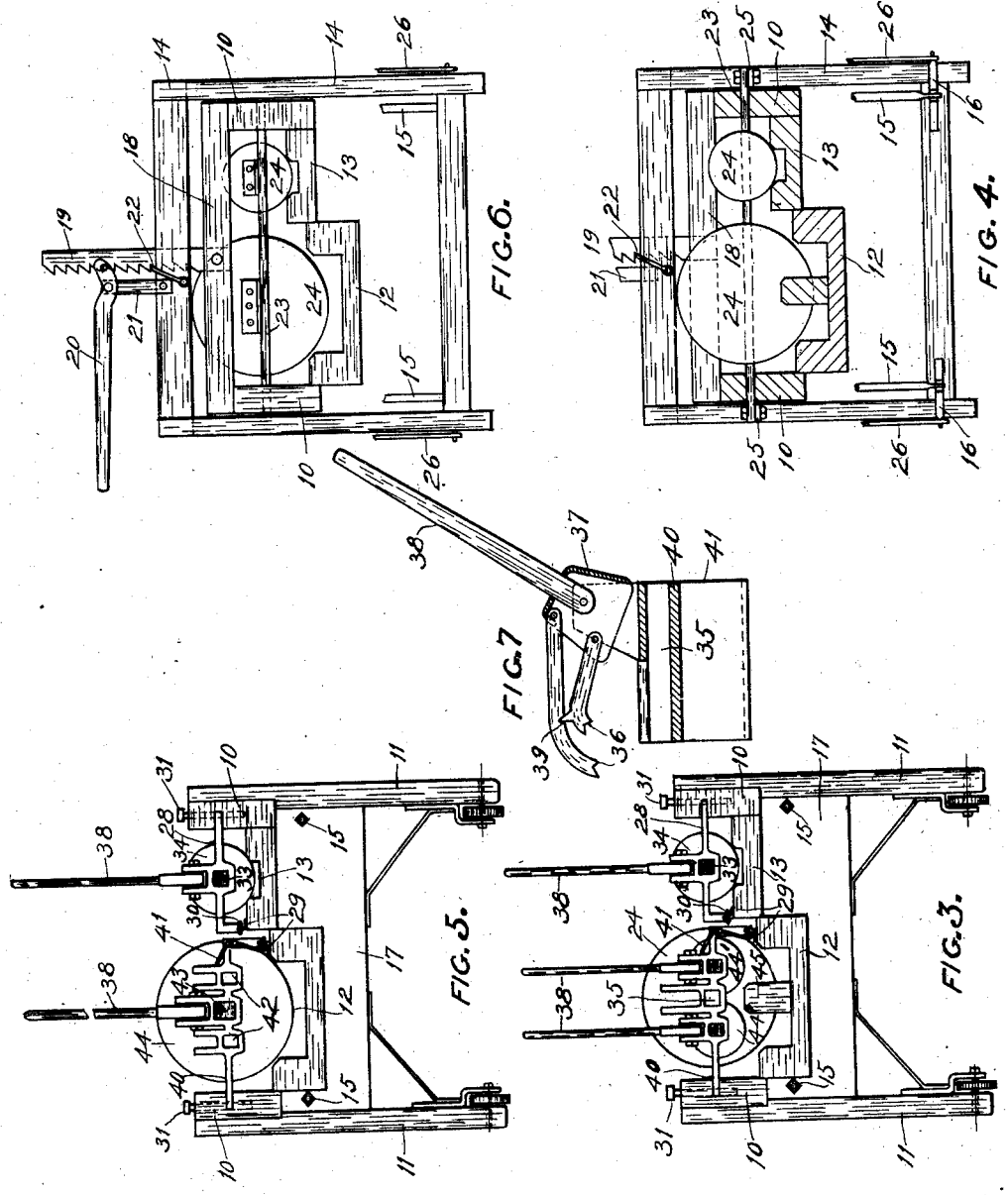
WITNESSES. INVENTOR.
Elmer L. McKinnon,
By Benedict, Morsell & Caldwell
ATTORNEYS.

UNITED STATES PATENT OFFICE.

ELMER LUDINGTON McKINNON, OF SHEBOYGAN FALLS, WISCONSIN.

CHEESE-PRESS.

No. 882,792.     Specification of Letters Patent.     Patented March 24, 1908.

Application filed May 2, 1907. Serial No. 371,561.

*To all whom it may concern:*

Be it known that I, ELMER L. McKINNON, residing in Sheboygan Falls, county of Sheboygan, and State of Wisconsin, have invented new and useful Improvements in Cheese-Presses, of which the following is a description, reference being had to the accompanying drawings, which are a part of this specification.

This invention has for its object to provide a cheese press with a novel means for automatically applying continuous pressure to the cheese.

Another object of the invention is to provide a cheese press of novel construction, whereby it may be made convertible for pressing large cheese or small cheese.

Another object of this invention is to improve upon general details of construction of cheese presses.

With the above and other objects in view the invention consists in the cheese press herein claimed and its parts and combinations of parts and all equivalents.

Referring to the accompanying drawings in which like characters of reference indicate the same parts in the several views; Figure 1 is a side elevation, partly in section, of a cheese press constructed in accordance with this invention, having one side arranged for pressing a single gang of large cheese. Fig. 2 is a plan view thereof, having one side arranged for pressing a double row of small cheese; Fig. 3 is a rear end elevation thereof arranged as shown in Fig. 2; Fig. 4 is a transverse sectional view thereof arranged as shown in Fig. 2; Fig. 5 is a rear end elevation thereof arranged as shown in Fig. 1; Fig. 6 is an end elevation of a similar press with one side arranged for pressing the single gang of large cheese; and, Fig. 7 is an enlarged detail view of the rack plunger feeding mechanism.

In these drawings 10 represents a main frame which is mounted on supporting legs 11 suitably braced so as to be rigid therewith, said frame having one or more troughs for receiving gangs of cheese to be compressed and for collecting and conveying the whey and other liquids expressed from the cheese to the front lower end of the frame. As here shown the trough on one side of the frame is a large trough 12 and the trough on the other side of the frame is a smaller trough 13.

It will be understood that the invention is not confined to the arrangement of the double troughs as here shown, as either trough may be used singly or a number of troughs of one kind may be used together with the associated mechanism therefor to be described.

The frame 10 is adapted to swing upon the leg members 11 and its front free end works within a rectangular guide frame 14 which is rigidly braced from the other end of the frame by means of brace bars 15 mounted on plates 16 at the lower end of the frame 14 and connecting with a cross piece 17 extending between the leg members 11 and supporting the troughs 12 and 13. The front end of the main frame has a cross bar 18 extending across its top to which is connected a rack 19 adapted to be engaged by means of a hand lever 20 working on a link 21 on the frame 14 for lifting the main frame, there being a pawl loop 22 on the guide frame for engaging the rack and holding the main frame suspended in the guide frame when desired.

A pressure bar 23 extends across the main frame, passing through slots in the sides thereof which are protected by guard plates 50, and has disk-shaped heads 24 mounted thereon forming the end abutments for the gangs of cheese in the troughs, and this presser bar is given a tendency to move against the cheese, so as to exert continuous pressure thereon, by having its ends connected by links 25 with inclined bars 26 which are pivotally connected to the plates 16 on the guide frame, said links 25 being guided by bearing against grooved rollers 27 which are mounted on brackets on the sides of the main frame. When the main frame is supplied with gangs of cheese bearing against the heads 24 the weight of the main frame and the cheese causes it to tilt upon its leg members 11 and lower the front end thereof. As the rods 26 are lowered they exert a tension upon the links 25 and cause the presser bar 23 to slide in the frame toward the cheese, the friction rollers 27 guiding the links 25 during such movement.

The edges of the shoulders forming the side walls of the troughs are beveled to receive the hoops of the gangs of cheese, and each trough is provided with an adjustable rack frame carrying one or more rack plungers for giving pressure to the cheese. The rack frame 28 for the smaller trough 13 comprises a plate with one edge fitting in a slot in the side wall of the main frame and its other side turned downwardly and grooved to fit upon an angle iron track 29 along the edge of the trough 13, there being a pin 30 fitting in openings of the angle iron track to hold the track frame in any of its adjustments along the trough and a pin 31 fitting in the side wall of the main frame to engage an opening 32 in the rack frame to further lock the rack frame in its adjusted position against backing during compression. A rack 33 carrying a plunger head 34 on its end slidably fits in a guideway 35 of the rack frame 28 and is adapted to be engaged by a pair of pawls 36 on the frame 37 of a hand lever 38 which is pivoted between a pair of upstanding ears on the rack frame. The pawls 36 are so positioned relative to the pivotal point of the head of the hand lever that during the oscillations of the hand lever one pawl moves in one direction as the other pawl moves in the opposite direction and consequently by such oscillations the rack is fed forwardly. The lower pawl is provided with a spur 39 to engage a notch in the upper pawl for holding them disengaged from the rack when desired.

The rack frame 40 for the larger trough 12 is similarly mounted by having one edge sliding in a slot in the side of the main frame and the other edge turned downwardly and grooved to ride on an angle iron track 29, there being a catch 41 pivoted to the end of the frame and adapted to enter openings in the track to lock the rack frame in its adjustments and also a pin 31 fitting in openings through the side wall of the main frame to engage the rack frame. The rack frame 40, besides having a central guideway 35 for a rack 43 carrying a plunger head 44, has a pair of smaller guideways 42 at the sides thereof which are adapted to receive a pair of smaller racks 43' carrying smaller plunger heads 44' and operated by hand levers 38 in the same manner and by the same means as with the other construction above referred to. When the pair of smaller racks 43' are employed the larger trough 12 is adapted for use with a pair of gangs of smaller size cheese, there being a removable beveled partition or guide 45 to be placed in the trough 12 at such time to form with the beveled edges of the sides of the trough a pair of guideways for the cheese hoops.

In operation the main frame is lifted by means of the lever 20 until it is supported in its highest position by the frame 14, where it is locked by the pawl 22 and the gangs of cheese are placed in position on their guideways, the gange of small cheese on trough 13 and a gang of large cheese on trough 12 if it is without the partition, or a pair of gangs of small cheese if the partition is in place. Then the track frames are moved toward the cheese until the plunger heads bear thereon when said frames are locked in place both by the pins 31 and the pins 30 and the pivoted catches 41 and then the racks are separately fed toward the cheese by the operation of their respective hand levers 38, the two smaller rack plungers 44' being employed with the frame 40 if two gangs of cheese are used in the trough 12 and the single larger rack plunger 44 being employed if the larger cheese are pressed in this trough. When the desired compression is attained through the operation of the hand levers, the pawl 22 is disengaged from the rack 19 so that the weight of the main frame and its contents will serve to apply continuous pressure upon the cheese through the action of the inclined bars 26, the frame 14 being prevented from displacement during this action of the inclined rods by means of the tie rods 15.

By means of the removable partition 45 and the convertible rack frame 40 the one side of the press may be converted from a large cheese press to a double small cheese press, a feature of advantage which is very desirable in a device of this nature. By the construction of this invention a pair of troughs may be arranged side by side without an objectionable partition therebetween.

What I claim as my invention is;

1. A cheese press, comprising a main frame for holding the cheese and having supports at one end, a presser bar extending across the frame and adapted to engage the cheese, and an inclined bar mounted on the floor and connected with the presser bar so as to be moved by the movements of the main frame for giving continuous pressure to the cheese by reason of the weight of the main frame and its contents.

2. A cheese press, comprising a main frame for holding the cheese and having supports at one end, a presser bar extending across the frame and adapted to engage the cheese, an inclined bar mounted on the floor and connected with the presser bar so as to be moved by the movements of the main frame for giving continuous pressure to the cheese by reason of the weight of the main frame and its contents, and a tie rod connecting the lower part of the inclined rod with the main frame.

3. A cheese press, comprising a main frame for holding the cheese and having supports at one end, a presser bar extending across the frame and adapted to engage the cheese, a link connected to the presser bar, and an inclined bar mounted on the floor and connected with the link so as to be moved by the movements of the main frame for giving continuous pressure to the cheese by reason of the weight of the main frame and its contents.

4. A cheese press, comprising a main frame for holding the cheese and having supports at one end, a presser bar extending across the frame and adapted to engage the cheese, a link connected to the presser bar, a guide on the main frame against which the link bears, and an inclined bar mounted on the floor and connected with the link for giving continuous pressure to the cheese by reason of the weight of the main frame and its contents.

5. A cheese press, comprising a main frame for holding the cheese and having supports at one end, a presser bar extending across the frame and adapted to engage the cheese, a link connected to the presser bar, a roller guide on the main frame against which the link bears, an inclined bar mounted on the floor and connected with the link, and a tie rod connecting the inclined rod with the main frame.

6. A cheese press, comprising a main frame for receiving the cheese and having supports at the one end, a presser bar extending across the main frame at the other end and slidable in guides thereof, means on the main frame for pressing the cheese against the presser bar, links connected to the ends of the presser bar, a frame having means for lifting the free end of the main frame, inclined rods pivotally mounted thereon and connected with the links, roller guides on the main frame engaged by the links, and tie rods connecting said frame with the leg supported end of the main frame.

7. A cheese press, comprising a main frame forming a trough for containing one or more gangs of cheese, a rack frame adjustably mounted across the trough and having a central rack guide and a pair of rack guides at the sides thereof, and rack plungers with their operating means adapted to be fitted in the central rack guide or in the side rack guides, whereby a single gang of large cheese or a pair of gangs of small cheese may be compressed thereby, and a partition located in the trough for supporting the pair of gangs of small cheese, being removable to accommodate the gang of large cheese.

In testimony whereof, I affix my signature, in presence of two witnesses.

ELMER LUDINGTON McKINNON.

Witnesses:
 JNO. E. THOMAS,
 STEDMAN THOMAS.